United States Patent [19]

Ramirez-Coronel et al.

[11] Patent Number: 5,373,211
[45] Date of Patent: Dec. 13, 1994

[54] TURBINE GENERATOR STATOR END FLOATING WINDING SUPPORT

[75] Inventors: Lorenzo E. Ramirez-Coronel, Oviedo; Charles M. Rowe, Orlando; Charles L. Senic, Casselberry; James J. Krizek, Winter Springs; Felix M. Detinko, Winter Park, all of Fla.

[73] Assignee: Westinghouse Electric Corporation, Pittsburgh, Pa.

[21] Appl. No.: 195,495

[22] Filed: Feb. 14, 1994

[51] Int. Cl.⁵ .............................................. H02K 3/46
[52] U.S. Cl. ................................. 310/260; 310/43; 310/91; 310/271
[58] Field of Search ............... 310/260, 270, 271, 45, 310/91, 43; 336/197

[56] References Cited

U.S. PATENT DOCUMENTS

| | | | |
|---|---|---|---|
| 3,988,625 | 10/1976 | Jager et al. | 310/260 |
| 4,088,913 | 5/1978 | Prigorovsky et al. | 310/260 |
| 4,344,006 | 10/1982 | Mendelson | 310/45 |
| 4,379,243 | 4/1983 | Dailey et al. | |
| 4,387,317 | 6/1983 | Alkire et al. | |
| 4,488,079 | 12/1984 | Dailey et al. | 310/260 |
| 4,501,985 | 2/1985 | Dobson et al. | 310/270 |
| 4,563,607 | 1/1986 | Cooper et al. | |
| 4,618,795 | 10/1986 | Cooper et al. | |
| 4,782,579 | 11/1988 | Rowe et al. | 310/260 |
| 4,891,540 | 1/1990 | Cooper et al. | |
| 4,942,326 | 7/1990 | Butler, III et al. | |
| 5,177,385 | 1/1993 | Cooper et al. | 310/260 |

FOREIGN PATENT DOCUMENTS

1406690  6/1990  U.S.S.R. ............... 310/260

*Primary Examiner*—R. Skudy
*Attorney, Agent, or Firm*—G. R. Jarosik

[57] ABSTRACT

A support assembly for the end windings of a turbine generator includes a plurality of braces which are spaced apart around the circumference of the winding basket and which are mechanically connected to support rings disposed around the stator coils. The support assembly is decoupled from the stator core such that the end windings and end winding support structure float freely of the stator core during normal generator operating conditions. During abnormal short circuit operating conditions, the support assembly contacts brackets on the stator core such that the end windings are slidably engaged upon and supported by the stator core. Radial clamps tightly secure the top and bottom coils to the end winding support assembly to apply radial compressive load to the coils to prevent radial displacement of the coils and to maintain the end winding-end winding support structure as a monolithic structure capable of withstanding abnormal operating conditions.

10 Claims, 2 Drawing Sheets

TURBINE GENERATOR STATOR END FLOATING WINDING SUPPORT

FIELD OF THE INVENTION

The present invention relates generally to dynamo-electric machines. More particularly, this invention relates to end winding support assemblies of large turbine generators.

BACKGROUND OF THE INVENTION

The stator coil end windings of the conductors of a turbine generator typically extend axially from the stator core structure for a significant distance. The straight segments of the conductors are disposed in the stator core slots such that they are supported by the slots, however, the end windings extend outward from the slots a significant distance such that they are not adequately supported by core slots. Thus, the end windings are subject to severe vibrations and stress, as well as the influence of their own weight, during operation. Adverse structural deformations can be caused by mechanical vibrations during normal operations or the very large electromagnetic forces which occur during abnormal short-circuit or fault conditions.

Normally, each individual conductor is braced to its associated conductors to form a conically shaped end winding assembly which is coaxial with, and extends axially from, the stator structure. Typical turbine generator designs employ two coaxial stator coil assemblies with the straight segments of an inner assembly of bottom coils being disposed radially outward from the assembly of top coils in the stator core slots. The end winding segments of the bottom coils are associated in a conical shape which is radially outward from, and coaxial with, the similarly associated conical shape of the end winding segments of the top coils.

Bracing and securing of the end winding assemblies has heretofore been done with conformable pads or blocks located between various support rings. Known support rings extend around the end winding assemblies and are mechanically affixed to brackets which are, in turn, mechanically affixed to the stator core structure for securing the rings, and thus the end windings, in place. Radial clamps banded around the top and bottom coils are also known for providing relatively permanent tightness between the coils. Examples of these known winding supports are those presented in Alkire et al—U.S. Pat. No. 4,387,317 and Cooper et al—U.S. Pat. No. 4,563,607 and U.S. Pat. No. 4,618,795, which are herein incorporated by reference.

However, despite substantial improvements, there is a continuing desire for more reliable end winding support assemblies which minimize excessive vibration, wear of coil insulation, and fatigue cracking of series and copper strand phase connections.

The ring support structure disclosed in Alkire secures the end windings by exerting a radially inward force on the bottom coil and functions in combination with a radial clamp to provide a free-standing, or floating support for the end winding assembly. However, the ring support structure is not supported in any manner such that the entire assembly including the windings and the winding support members remain unsupported. It is known that during abnormal short-circuit operating conditions the forces in the generator tend to expand the windings in a manner which causes fatigue in the ring support members- Thus, since the winding support structure is not supported in any manner, these forces damage the windings and the winding support structure.

The Cooper patents disclose a ring support structure for the stator coils which is mechanically secured to a plurality of braces disposed around the circumference of the end windings. The braces function as a stop to prevent excessive coil deflection during abnormal short circuit operation. The brace is in turn mechanically secured to the stator core such that the winding support structure is firmly secured to the stator core. However, since the brace, and thus the end winding support assembly, is mechanically secured to the stator core, excessive vibration forces are known to cause cracking or abrasion of the end windings and the winding support components. A complex arrangement of cushioning material which forms an elastomer layer and a slip layer is disposed between two segments of the brace in U.S. Pat. No. 4,618,795 in order to decouple the coils from the coil support arrangement. However, this system is complex and costly and the cushion material is known to wear from abrasion over a long period of operation.

Accordingly, there is a need for an end winding support structure which provides reliable support for the end windings of the top and bottom coils and which avoids the problems associated with prior art winding support assemblies. The present invention provides a winding support assembly which satisfies this need.

SUMMARY OF THE INVENTION

The present invention provides a winding support assembly for end winding components of a turbine generator. The support assembly comprises a plurality of brackets mechanically affixed to the stator core and a stator winding support comprising a plurality of braces in support engagement with the bottom coils of the stator, and two or more support rings disposed around the end windings, the support rings being mechanically connected to the braces. Portions of the stator winding support are located in close proximity to a corresponding one of the brackets such that a gap is formed between the stator winding support and the brackets. During certain generator operating conditions when the stator winding support apparatus contacts one or more of the brackets, the stator winding support slidably engages the brackets such that the stator winding support is supported upon the brackets. One or more radial clamps are disposed around adjacent top and bottom coils to tightly secure the coils to the stator winding support such that the end windings and the end windings support assembly floats freely of the stator core, but which is also supported upon the stator core during certain operating conditions.

DETAILED DESCRIPTION OF THE PREFERRED EMBODIMENTS

Figure 1:
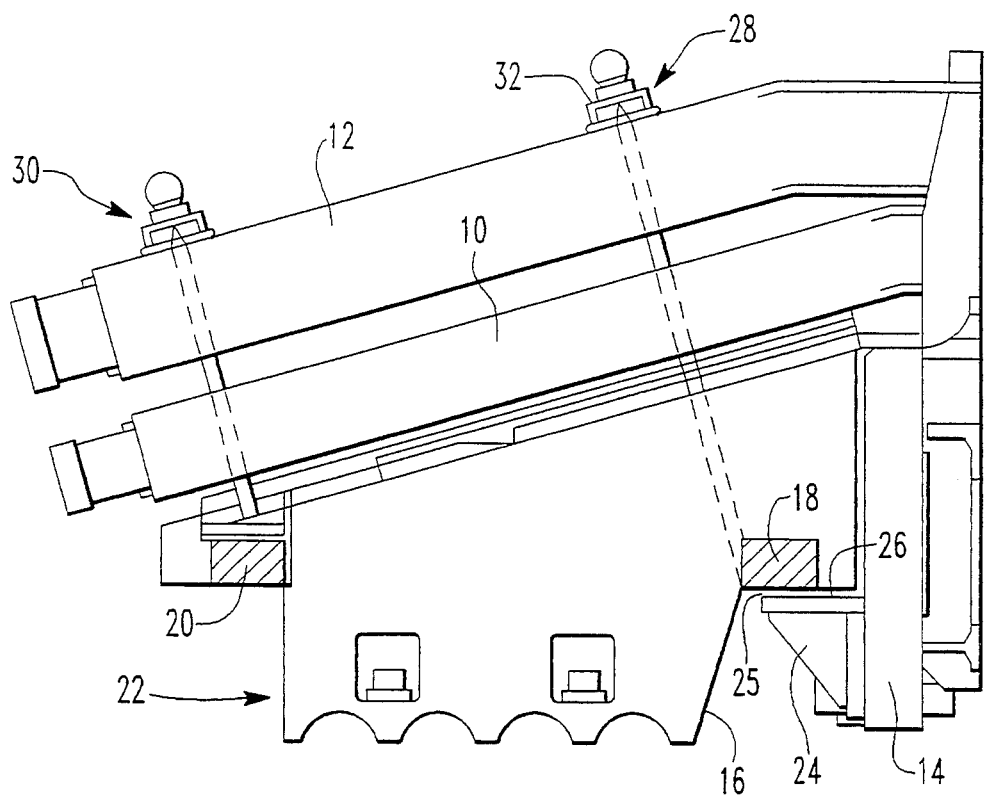
FIG. 1 shows an end winding support assembly in accordance with the present invention.

There is shown in FIG. 1 a portion of the end winding of a turbine generator in accordance with the present invention. The standard convention is herein adopted wherein the first coil wound into the stator coil is referred to as the bottom coil and the last coil wound into the stator coil slot is referred to as the top coil. Thus, FIG. 1 shows the bottom coil 10 and top coil 12 of a typical turbine generator at the end winding portion of the coil construction where the stator coils extend axially from slots in the stator core components 14. The stator coil end windings generally form a conical shape which is coaxial with, and extends axially from, the stator core structure. Thus, top coil 12 is located radially inward of bottom coil 10 from the central axis of the stator core structure.

As will be recognized by those familiar with this art area, the illustrations of the figures of this application are consistent with common practice in showing end turn support arrangements. The end turns actually are curved into and out of a plane through the axis of the machine rather than directly axially extending as implied by the drawings. The top and bottom coils normally curve in opposite directions and are joined, respectively, to another bottom coil and another top coil from different slots.

Figure 2:
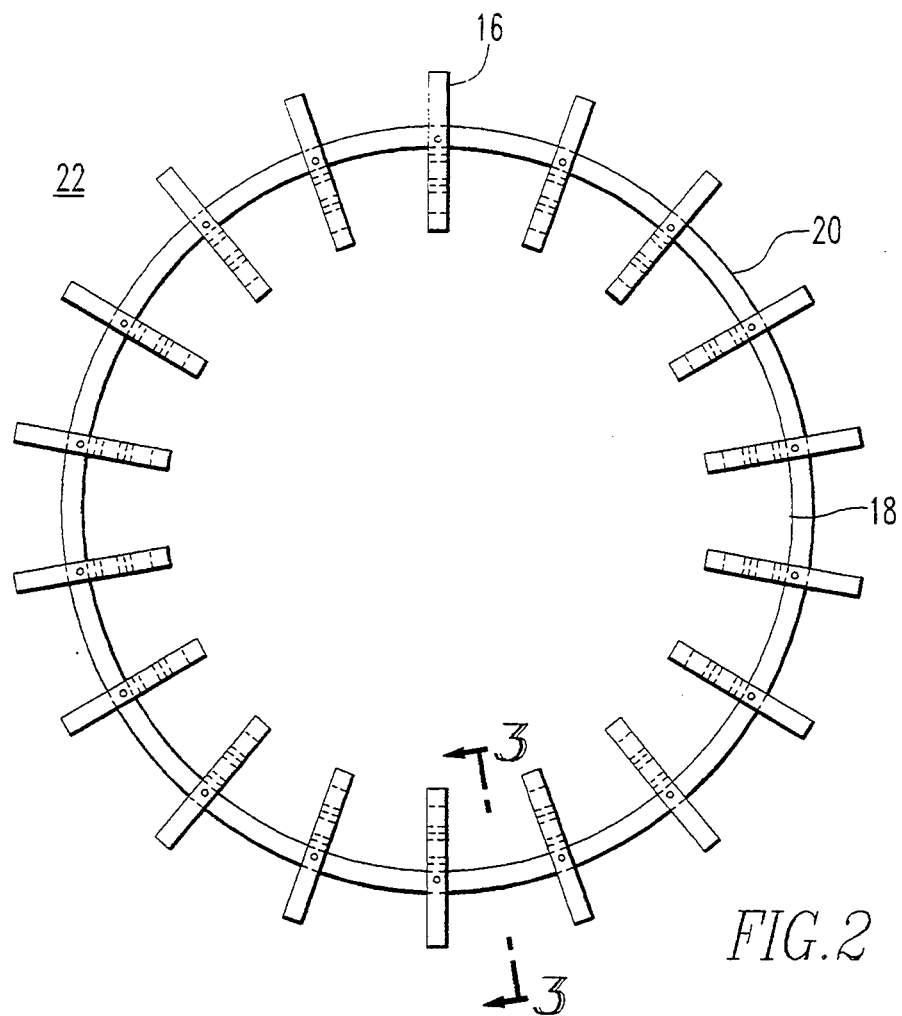
FIG. 2 shows a stator winding support in accordance with the present invention.
Figure 3:
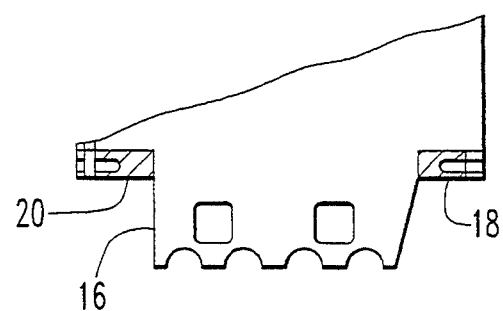
FIG. 3 shows the stator winding support taken along the line 3—3 of FIG. 2.

Coils 10 and 12 are supported upon a plurality of braces 16 in combination with two or more support rings 18 and 20. Referring to FIGS. 2 and 3, the combination of braces 16 and support rings 18 and 20 is herein referred to as stator winding support 22 such that stator winding support 22 exerts a radially inward force on bottom coil 10 so as to provide tight radial support for the end winding conductors. Referring to FIG. 2, support rings 18 and 20 are disposed around the circumference of the end winding assembly and braces 16 are mechanically connected to the support rings and are spaced around the periphery of the coils. Support rings 20 and 18 are preferably constructed of a suitable nonmetallic material such as glass-reinforced epoxy resin. In a preferred embodiment, eighteen braces 16 are disposed around the periphery of stator winding support 22 for providing reliable support for the end windings.

The number of support rings, as well as the size and location, of the support rings is not limited to the embodiment shown. The number of rings and their size and location can be chosen to provide a desired stiffness such that the global natural frequency of the end winding and end winding support components, commonly referred to as the winding basket, is within acceptable limits. Also, the number, size and location of the support rings should provide the strength required to minimize the adverse effects of abnormal events which occur during certain generator operating conditions, such as short circuit, as discussed in further detail below.

Referring to FIG. 1, a plurality of brackets 24 are fixedly secured to the stator core components 14 and are spaced apart around the periphery of the stator core radially outward of bottom coils 10. Stator winding support 22 is disposed around the end windings such that each one of the braces 16 is located proximate a corresponding bracket 24. Thus, in a preferred embodiment, eighteen brackets 24 are fixedly secured circumferentially around the stator core.

Stator winding support 22 is disposed around the coils with a portion of the stator winding support in the area of the braces 16 being located proximate a corresponding bracket 24 such that a gap 25 is formed between the stator winding support 22 and the top surface 26 of the brackets 24 in the area of the braces 16. In a preferred embodiment, a portion of ring 18, as well as a portion of one of the braces 16, is located proximate a corresponding bracket 24 such that gap 25 is formed between a portion of ring 18 and a portion of brace 16 and the top surface 26 of bracket 24.

Thus, the stator winding support 22 is not mechanically coupled to the brackets 24 such that the end winding assembly, including coils 10 and 12, is free to float in supporting engagement with the stator winding support. Stator winding support 22 allows for free expansion of the end winding and winding support components in the axial direction and limited free expansion in the radial direction. Thus, fatigue and cracking of the end winding and the end winding support components is prevented during thermal expansion. Also, vibration effects on the end winding and end winding support structure is minimized since the braces of the end winding support are not coupled to the brackets on the stator core.

During certain turbine generator operating conditions, such as abnormal short-circuit operating conditions, very large electromechanical forces are distributed to the end winding assembly such that the coils expand radially causing excessive forces on the windings and winding support assembly. Under these conditions, portions of the stator winding support can move into contact with one or more of the corresponding brackets 24 such that the gap 25 between the stator winding support 24 and the top surface of the bracket is closed. During operation under these conditions, the stator winding support becomes slidably engaged and supported upon the bracket such that the brace and bracket provide a stop to prevent excessive coil deflection during short circuits.

Figure 4:
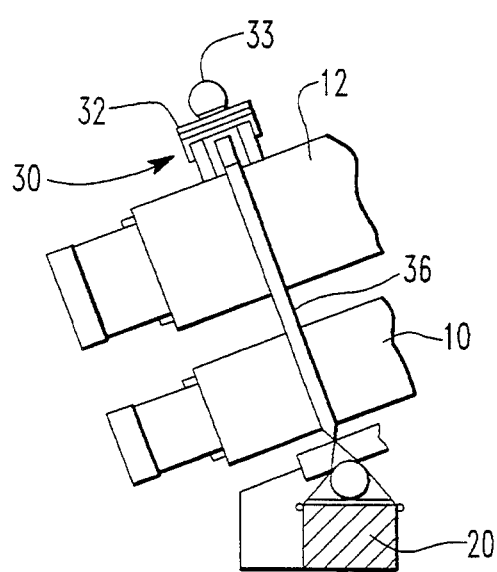
FIG. 4 shows a cut-away view of a radial clamp assembly in accordance with the present invention.
Figure 5:
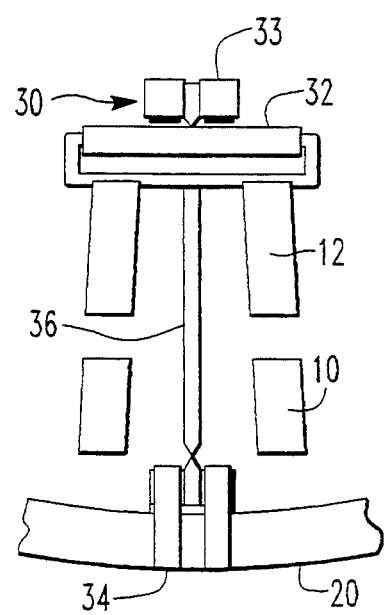
FIG. 5 shows another view of the radial clamp assembly in FIG. 4.

Referring to FIGS. 4 and 5, in a preferred embodiment of the present invention wherein clamp 30 is shown by way of example, a plurality of radial clamps 28 and 30 are spaced around the circumference of the end windings, between braces 16, such that a single radial clamp is fixed around adjacent top and bottom coils. A support block 32 is located radially above an adjacent pair of coils such that the block bears against two top coils 12. Pin 33 is disposed across each support block 32 transverse to the direction in which the coils run.

At the bottom of radial clamps 28 or 30 a clamp holder 34 is disposed around corresponding rings 18 or 20 such that the radial clamp is fixedly secured to the support rings of the stator winding support 22. A band 36 is disposed in a continuous loop such that the band 36 is secured to a corresponding pin 33 and clamp holder 34. The banding material is pretensioned such that the radial clamps 28, 30 secure the end winding coils 10, 12 in tight engagement with the stator winding support 22. In a preferred embodiment, band 36 comprises a resin impregnated material, such as a glass fiber reinforced epoxy resin impregnated material.

Radial clamps 28, 30 and stator winding support 22 provide an end winding support assembly which tightly secures the stator coils together in a floating support assembly which is not coupled to the stator core. Accordingly, the present invention provides for a low cost floating end winding-end winding support arrangement such that during normal operating conditions the adverse effects of thermal expansion and vibrational forces are minimized. Also, during abnormal operating conditions, such as short-circuit operation, the end winding support apparatus provides support against the stator core so as to accommodate coil deflections caused by large electromagnetic forces.

Although particular embodiments of the present invention have been described and illustrated herein, it is recognized that modifications and variations may readily occur to those skilled in the art. Consequently, it is intended that the claims be intended to cover such modifications and equivalents.

We claim:

1. A support assembly for end winding components of a turbine generator, said generator having a stator core, said end winding components including a plurality of top and bottom coils, said support assembly comprising:
   a plurality of brackets mechanically affixed to said stator core, each said bracket having a top surface;
   a stator winding support having:
   a plurality of braces in support engagement with said bottom coils;
   two or more support rings disposed around said top and bottom coils, said support rings mechanically connected to said braces; and
   said stator winding support being positioned such that a portion of said stator winding support is located in close proximity to a corresponding one of said brackets such that a gap is formed between said stator winding support and said top surface of said brackets, wherein when said stator winding support contacts one or more of said brackets in operation, said stator winding support is supported upon and in sliding engagement with said brackets.

2. The support assembly of claim 1, wherein a first portion of one of said support rings and a second portion of one of said braces are located in close proximity to a corresponding one of said brackets such that a gap is formed between said first and second portions and said top surface of said bracket.

3. The support assembly of claim 1, further comprising one or more radial clamps securing said top and bottom coils to said stator winding support, each said radial clamp mechanically connected to said stator winding support.

4. The support assembly of claim-3, wherein said radial clamp comprises a first and second end, said first end mounted above two adjacent top coils and said second end being fixedly secured to one of said support rings.

5. The support assembly of claim 1, wherein said stator winding support has two support rings.

6. The support assembly of claim 1, wherein said support rings comprise glass-reinforced epoxy resin.

7. The support assembly of claim 1, wherein said stator winding support has eighteen braces.

8. A turbine generator, comprising:
   a stator having a core and a stator winding, said core having a plurality of slots therein and a plurality of brackets disposed around said core;
   said stator winding including a plurality of top and bottom coils, each said top and bottom coils including inner portions disposed in a corresponding one of said slots and end portions extending axially from each end of said core;
   a stator winding support assembly for restraining said end portions, comprising:
   two or more ring supports disposed around said stator winding;
   a plurality of braces spaced around said stator winding, each said brace having a top surface, said bottom coils slidably engaged with said top surface, said braces mechanically connected to said ring supports; and
   a portion of said support assembly being located in close proximity to a corresponding one of said brackets such that a gap is formed between said support assembly and said brackets, wherein when said support assembly contacts one or more of said brackets in operation, said stator winding support is supported upon and in sliding engagement with said brackets.

9. The turbine generator of claim 8, further comprising one or more radial clamps securing said top and bottom coils to said stator winding support, each said radial clamp mechanically connected to said stator winding support.

10. The support assembly of claim 8, wherein said support rings comprise glass-reinforced epoxy resin.

* * * * *